Dec. 16, 1924.
R. W. SEYMS
WATER CONTROL FOR SPRINKLERS
Filed Sept. 11, 1923
1,519,338
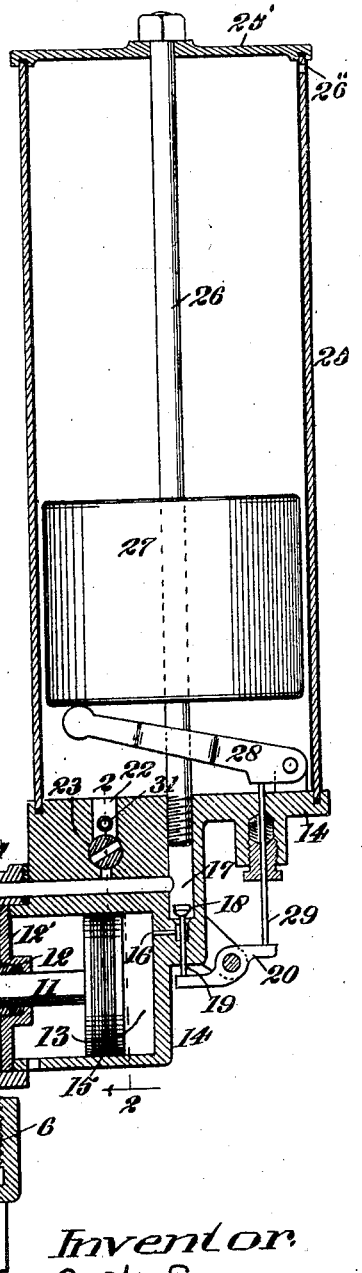
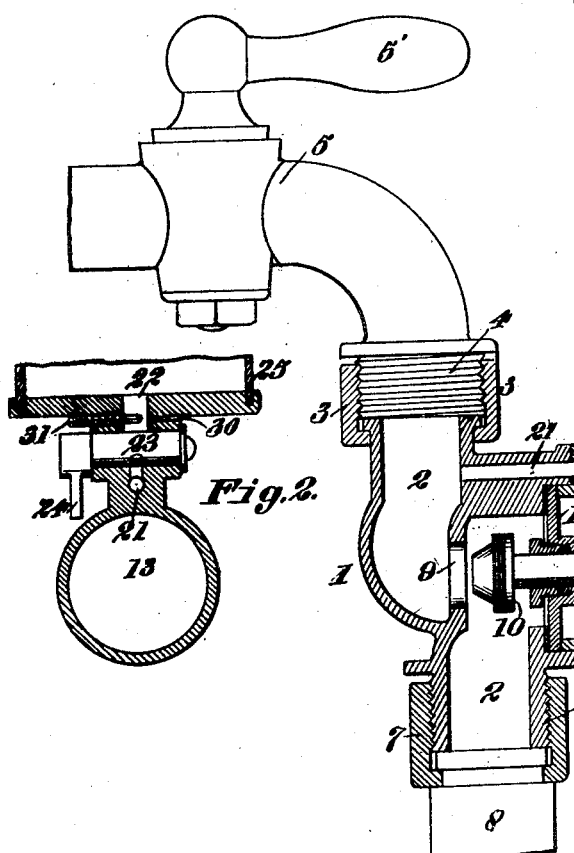
Inventor.
R. W. Seyms
By Acker & Totten
his Attorneys.

Patented Dec. 16, 1924.

1,519,338

UNITED STATES PATENT OFFICE.

ROBERT W. SEYMS, OF SAN FRANCISCO, CALIFORNIA.

WATER CONTROL FOR SPRINKLERS.

Application filed September 11, 1923. Serial No. 662,153.

*To all whom it may concern:*

Be it known that I, ROBERT W. SEYMS, a citizen of the United States, residing at city and county of San Francisco and State of California, have invented certain new and useful Improvements in Water Controls for Sprinklers, of which the following is a specification.

The present invention comprises an automatic water control for use in connection with the sprinkling of lawns, gardens, or ground surfaces generally.

In the use of water for the sprinkling of lawns it is only required or necessary that the sprinkler employed for such purpose permit the outflow of water therefrom for a given period of time for the ground area within the limit of the water zone of discharge from the sprinkler and a continuation of the water discharged from the sprinkler over a given time or sprinkling period is water permitted to run to waste and is therefore not only a loss of water but a needless expense to the consumer thereof. For instance, a gardener usually places the sprinkler in operation for the watering of a given area of a lawn and then leaves the water running while he attends to other duties in connection with the garden, paying no further attention to the sprinkler until he comes to notice the water running to waste or has finished his other work in hand or believes the sprinkler has run sufficiently long in its fixed position, when he shifts the sprinkler to another position or portion of the lawn to be watered. This haphazard or inefficient manner of carrying out the operation of lawn sprinkling is the occasion of a large waste of water, which, in sections of the country where the water charge is based on cubic feet measurement, is a serious item of expense to the consumer and equally so, such waste of water is quite a problem to a water company operating in such communities as have a scarcity of rainfall. Practical operation in the use of lawn sprinklers has demonstrated that a given ground area of a lawn or garden to be sprinkled does not require for watering purposes a flow of water thereon from a sprinkler system of a period in excess of approximately fifteen minutes in order to properly saturate or wet the ground area, so that a timed flow of water maintained in excess of said period is water permitted to run to waste and is a loss thereof.

The object of the present invention is to provide against the flow of water from a lawn sprinkler or sprinkler system after the issuance of water therefrom for a predetermined period of time, which object is attained by installing or placing in association with the water supply for the sprinkler or sprinkler system of means for automatically cutting off the water flow after the sprinkler has maintained its discharge of water under a head pressure for a predetermined period of time.

In order to comprehend the invention, reference should be had to the accompanying sheet of drawings, wherein—

Fig. 1 is a vertical sectional view of the automatic controlling means for the water applied to an ordinary garden faucet, illustrating a portion of a garden hose applied to the said means.

Fig. 2 is a vertical sectional view taken on the irregular line 2—2, Fig. 1 of the drawings and viewed in the direction of the arrow.

In the drawings, the numeral 1 is used to indicate a body structure provided interiorly with a control water passageway 2, said body structure having applied to one of its end extremities a coupling ring 3 for the attachment thereof to the threaded nipple 4 of an ordinary garden faucet 5. The opposite extremity 6 of the body structure 1 is externally threaded in order to receive the coupling 7 of an ordinary garden hose 8, to the free or outer end of which is applied a water sprinkler, not shown. Within the water passageway 2 of the body structure 1 is provided a port 9 adapted to be controlled, in the present case, by a pressure actuated horizontally movable valve 10, the stem 11 of which extends through a stuffing gland 12 and partitioning wall 12' into a pressure chamber 13 formed by a laterally extended casting 14 secured in any suitable manner to the body structure 1. To the outer end of the stem 13 is attached a piston head 15, adapted to be acted upon by water under pressure admitted into the pressure chamber 13 back of the piston head 15.

Water under pressure during the operation of the apparatus gains access into the pressure chamber 13 back of the piston 15 through a restricted valve control port 16, which establishes communication between the said pressure chamber 13 and a water chamber 17, the outflow of water under pressure from the said chamber 17 into the pressure chamber 13 being controlled by a vertically movable pilot valve 18, the downwardly extended stem 19 of which valve projects outwardly beyond the casting 14 and is adapted to rest upon the inner portion of a fulcrumed lever 20.

Communication is established between the upper portion of the water passage 2 and the water chamber 17 through the medium of the transversely disposed passage-way 21 formed through the body structure 1 and the casting 14 and with the passage-way 21 communicates a vertically extended port 22 formed within the casting 14 and within which passageway is fitted a ported rotatable valve 23 which is operatable from the outside of the structure by means of the handle 24.

To the casting 14 there is secured in any suitable manner a vertically extended shell or cylinder 25 which is closed by a cover plate 25′ and which shell or cylinder provides a water holding reservoir 26 and with which reservoir the valve controlled passageway 22 communicates. Through the shell or cylinder 25 is centrally extended a vertical tie rod 26′, which at its lower end screws into the casting 14 and serves to hold the shell or casing 25 tight to the said casting. Upon the rod 26′ is mounted for free, vertical sliding movement a float 27, which is raised within the chamber 26 by the pressure of the water admitted therein through the passage 22, the said float rising within the chamber or reservoir 26 as the water admitted therein under pressure through the passageway 22, bears against the under face thereof. There is interposed within the chamber or reservoir 26 between the float and the bottom of the reservoir a pivotally mounted lever 28 and which during the downward movement of the float 27 within the reservoir 26, is thrown or moved downwardly therewith. This lever acts to control the movement of a rod 29 against the upper surface of which it bears, said rod in turn at its lower end bearing upon the outer arm of the fulcrumed lever 20 and which rod 29 with the downward movement thereof through the action of the pivoted lever 28 throws upwardly the inner arm of the fulcrumed lever 20 to operate the valve stem 19 to unseat the pilot valve 18 and open communication between the chamber 17 and the pressure chamber 13 for permitting water under pressure flowing through the passageway 21 to move into the pressure chamber 13 to act against the piston head 15 for forcing inwardly the valve 10 to gradually close the port 9 and by so doing arrest the flow of water through the passageway 2 to the lawn sprinkler through the hose connection 8.

The cylinder, shell or container 25 is of a size adapted to hold a given quantity of water, say for instance, a pint more or less and from the passageway 22 above the rotatable valve 23 there is extended a leak opening or passageway 30, the flow of water therethrough being regulated or controlled by an adjustable valve 31, Fig. 2 of the drawings. The leak opening 30 is always an open one, but the flow or escape of water therethrough from the passageway 22 is regulated and controlled through the medium of the valve 31. The area of the said leak opening 30 is such that through the association therewith of the regulating valve 31, it will take approximately fifteen minutes for the water contained within the shell, cylinder, or container 25 to outflow therefrom.

When the attachment is applied to the garden faucet 5 with the garden hose 8 attached thereto and the sprinkler fixed in position on the lawn for operation, the first act of the gardener is to throw the handle 24 to shift the valve 23 to place its port opening in registry in whole or part with the water passage-way 22 and the valve of the faucet 5 is thrown by the handle 5′ to open the faucet and permit the flow of water therethrough under pressure into the passageway 2 of the structure 1.

A portion of the water flowing under pressure through the passageway 2 is by-passed through the passage-way 21 to the port or passage 22 and flows into the chamber 26, raising the float therein until the chamber 26 is filled with water, the air within the chamber 26 escaping therefrom during the upward movement of the float 26 through the escape opening 26′ formed in the wall thereof adjacent its stop. It only requires two or three seconds for the chamber 26 to become filled with water and as soon as water begins to discharge through the outlet opening 26′ the valve 23 is turned to cut off communication between the passage-way 22 and the passage-way 21. The moment the valve 23 is turned to close the said communication the water by-passing under pressure through the passage-way 21 will flow under pressure into the chamber 17 and move downwardly the pilot valve 18, causing its stem to throw downwardly the inner arm of the fulcrumed lever 20 and raise its outer arm to lift the stem 29 and raise the pivotal lever 28. The valve 18 is thus maintained seated while the pivotal lever 28 is free of the weight of the float 27. As the water gradually escapes from the chamber 26 through the minute valve controlled leak passage 30, the float 27 will move downwardly with the decreasing level of the water within the chamber 26 until it bears against the free end of the pivoted lever 28 when the weight of the float during its lowering movement while in contact with the lever 28 will swing downwardly said lever, moving therewith the rod 29 and swinging the fulcrumed lever 20 to throw upwardly its inner arm to raise or unseat the pilot valve 18 which when unseated establishes as before stated, communication between the chamber 17 and the pressure chamber 13 for permitting water flowing under pressure through the passageway 2 to by-pass through the passageway 21 into the pressure chamber 13 and back of the piston head 15 for gradually forcing inwardly the said piston head 15 and by the movement thereof causing the valve 10 to close the port 9, thus cutting off the flow of water through the passageway 2 to the sprinkler. With the water flow thus cut off the operation of the sprinkler ceases and the stoppage of water discharging therefrom gives notice to the gardener that such portion of the lawn has received its proper watering and the same should be moved to another position. When so moved it is required that the gardener throw the handle 24 to place the port of the valve 23 to open communication between the passageways 21 and 22 and the interior of the shell or cylinder 25, thus permitting water to enter therein for the raising of the float 27. On the chamber 26 becoming filled with water, the handle 24 of the valve 23 is thrown to close communication between the passageways 21 and 22, when the operation just described repeats itself. At this time the pilot valve 18 is unseated and the pressure of the water going through the passage-way 2 acts to unseat the valve 10 to open the port 9.

From the foregoing it will be noted that the valve 10 is operated to close the port 9 after the sprinkler has been in operation for a given length of time, or until such time as the chamber 26 has emptied itself of water, thereby preventing the waste of water which usually takes place in connection with the watering of a lawn through a sprinkler or sprinkling system. The apparatus is positive in its action and automatic throughout. While the apparatus has been described and illustrated in its preferred embodiment, it is obvious that changes may be made in the construction of the details of the working parts without departing from the spirit of the invention and which resides broadly in the providing of means for automatically controlling or cutting off the supply of water to a lawn sprinkler after the same has been in operation for a given period of time and I wish to be understood as claiming this feature as broadly as the state of the art will warrant.

I claim:

1. An automatic water control means for interposition between a water faucet and the hose connection for a sprinkler, the same comprising a body structure provided with a ported water passage-way, a fluid pressure actuated valve adapted to control the opening and closing of the port within said water way, a water reservoir associated with the body structure provided with a leakage outlet, a valve adapted to control the flow of water under pressure into the said reservoir, a pilot valve adapted to control the movement of the pressure actuated valve, and means thrown into action by the outflow of water from within the water reservoir for permitting an unseating of the pilot valve to produce a closing pressure relative to the pressure actuated valve.

2. An automatic water control means for incorporation within a sprinkler system for lawns, the same comprising a body structure provided with a ported passage-way for the flow therethrough of water under pressure, a pressure actuated valve adapted to open and close the port of said passage-way, means operated by a portion of the water under pressure for automatically admitting water under pressure to act on said valve to close the mentioned port and maintain a closing pressure against the same after water under pressure has flowed through the said passage-way for a pre-determined period of time, and means for varying the time of flow of water through the passage.

3. In combination with the water supply means of a sprinkler system, of a body structure adapted to be interposed within said means and provided with a ported passage-way for the flow therethrough of water under pressure, a fluid pressure actuated valve adapted to close the port of said passage-way, a reservoir provided with a leak opening associated with the body structure and adapted to receive from the water supply of the system a given quantity of water, and means thrown into action on a filling of the reservoir for cutting off pressure to the said valve to permit an opening of the mentioned port and for admitting an actuating fluid pressure to shift the valve to close the port on an emptying of the said reservoir.

4. In combination with the water supply means for a sprinkler system, of automatic means for cutting off the flow of water therethrough at predetermined moments for incorporation therein, the same comprising a body structure provided with a ported water passage-way, a fluid pressure actuated valve adapted to open and close said port, a pilot valve for controlling the movement of said pressure actuated valve, a water holding reservoir provided with a leak outlet associated with the body structure and adapted to receive therein water under pressure from said structure, and device thrown into action during the filling and emptying period of said reservoir for permitting a closing and an opening movement respectively of the pilot valve.

5. The combination with the water supply means, of a sprinkler system, a valve interposed within said means for controlling the flow of water therethrough, means for automatically actuating said valve to cut off the flow of water under pressure therethrough and for maintaining a water pressure against said valve for retaining the same seated, and means for releasing the seating pressure from said valve to permit the water pressure through said means to unseat the valve.

6. In combination with a fluid supply pipe, a fluid distributing pipe, a fluid controlling means located between the two and including a valve directly acted on by the fluid pressure and operated thereby in its opening and closing movements, means for releasing fluid pressure in rear of the valve to permit the pressure in front thereof to open the same, a fluid actuated timing apparatus, a valve, and a trip within the path of the timing apparatus and connected with the valve for admitting fluid pressure in rear of said valve for the closing thereof.

7. An automatically operated cut off device for incorporation within a water supply sprinkler system, the same comprising a body structure provided with a ported passage-way for the flow of water therethrough under pressure, and having a pressure chamber connected therewith, a pressure actuated piston located within the pressure chamber, a valve connected to said piston for controlling the opening and closing of the port of the mentioned passage-way, a water holding receptacle provided with a leakage outlet associated with the body structure, a valve controlling the by-pass flow of water under pressure within said receptacle, a pilot valve for controlling the admission of fluid under pressure within the pressure chamber to actuate the piston therein for shifting the valve carried thereby to close its port, and associated devices thrown into action during the emptying movement of the water holding receptacle to actuate the pilot valve for admitting fluid pressure into the pressure chamber to operate the piston therein for moving the valve carried thereby to close the port of water passage-way of the body structure.

In testimony whereof I have signed my name to this specification.

ROBERT W. SEYMS.